US012642253B2

(12) United States Patent 
Steiner et al.

(10) Patent No.: US 12,642,253 B2 
(45) Date of Patent: Jun. 2, 2026

(54) METHOD AND ASSEMBLY FOR IN-OVO SEXING OF BIRD EGGS

(71) Applicant: TECHNISCHE UNIVERSITÄT DRESDEN, Dresden (DE)

(72) Inventors: Gerald Steiner, Schwarzenberg (DE); Edmund Koch, Dresden (DE); Christian Schnabel, Dresden (DE); Grit Preusse, Radebeul (DE); Roberta Galli, Dresden (DE)

(73) Assignee: TECHNISCHE UNIVERSITÄT DRESDEN, Dresden (DE)

( * ) Notice: Subject to any disclaimer, the term of this patent is extended or adjusted under 35 U.S.C. 154(b) by 279 days.

(21) Appl. No.: 18/702,670

(22) PCT Filed: Oct. 24, 2022

(86) PCT No.: PCT/EP2022/079590 
§ 371 (c)(1), 
(2) Date: Apr. 18, 2024

(87) PCT Pub. No.: WO2023/072830 
PCT Pub. Date: May 4, 2023

(65) Prior Publication Data 
US 2024/0407341 A1 Dec. 12, 2024

(30) Foreign Application Priority Data

Oct. 25, 2021 (DE) ..................... 10 2021 127 696.9

(51) Int. Cl. 
*G01J 3/44* (2006.01) 
*A01K 43/00* (2006.01) 
(Continued)

(52) U.S. Cl. 
CPC ............. *A01K 43/00* (2013.01); *G01N 21/64* (2013.01); *G01N 21/65* (2013.01)

(58) Field of Classification Search 
CPC ........ A01K 43/00; G01N 21/64; G01N 21/65; G01N 33/08; G01N 2021/6419; 
(Continued)

(56) References Cited

U.S. PATENT DOCUMENTS 6,029,080 A * 2/2000 Reynnells .............. G01N 33/08 
600/407 
6,365,339 B1 * 4/2002 Daum .................. G01N 33/743 
530/827 
(Continued)

FOREIGN PATENT DOCUMENTS

CN 105191831 12/2015 
DE 10 2014 010 150 1/2016 
(Continued)

OTHER PUBLICATIONS

Roberta Galli et al., "Sexing of chicken eggs by fluorescence and Raman spectroscopy through the shell membrane", In PLOS one, Internet: https://doi.org/10.1371/journal.pone.0192554, Feb. 23, 2018, pp. 1-14. 
(Continued)

*Primary Examiner* — Abdullahi Nur 
(74) *Attorney, Agent, or Firm* — GREENBLUM & BERNSTEIN, P.L.C.

(57) ABSTRACT

The invention pertains to the technical fields of bioanalytics and agriculture, and relates to a method and to an assembly for in-ovo sexing of bird eggs. The aim of the present invention is to provide a method and an assembly by means of which in-ovo sexing of bird eggs is achieved with a stable predictive accuracy of the sex and which are simple and cost-effective. The aim is achieved using a method and an assembly in which a fertilised bird egg incubated for 3 to 9 days is irradiated with at least two light-emitting laser beam sources with different excitation waves after the shell is opened, the captured and processed fluorescence scattering (Continued)

Figure 1:
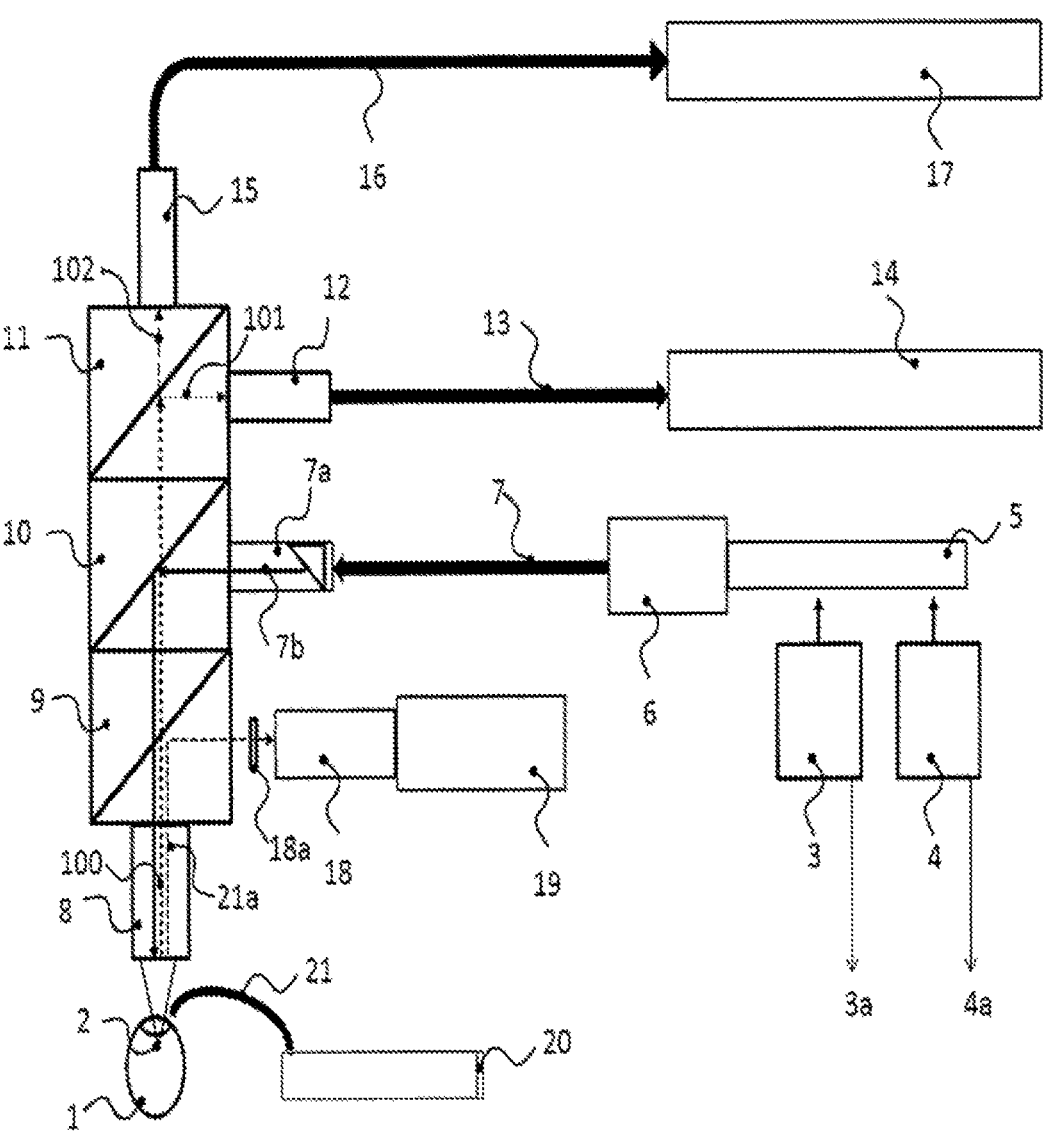

spectra and Raman scattering spectra being used, as complementary spectra associated with the different excitation wavelengths, to determine a classification value, and the sex being determined by comparing the determined classification value with an intrinsically determined threshold value. The method and the assembly can be used for sexing farm poultry.

15 Claims, 4 Drawing Sheets

(51) Int. Cl.
    *G01N 21/64*        (2006.01)
    *G01N 21/65*        (2006.01)

(58) Field of Classification Search
    CPC ... G01N 2021/6421; G01N 2201/1296; G01N 21/6486; G01J 3/44
    See application file for complete search history.

(56)             References Cited

U.S. PATENT DOCUMENTS

| | | | |
|---|---|---|---|
| 7,041,439 B2 * | 5/2006 | Phelps | G01N 1/34 |
| | | | 435/235.1 |
| 9,835,560 B2 | 12/2017 | Galli et al. | |
| 10,852,284 B2 | 12/2020 | Steiner et al. | |
| 11,378,565 B2 | 7/2022 | Preusse et al. | |
| 11,536,704 B2 | 12/2022 | Steiner et al. | |
| 11,879,778 B2 | 1/2024 | Steiner et al. | |
| 2004/0197771 A1 * | 10/2004 | Powers | G01N 21/55 |
| | | | 435/7.1 |
| 2012/0058052 A1 * | 3/2012 | Decuypere | A01K 45/00 |
| | | | 424/9.1 |
| 2015/0260704 A1 | 9/2015 | Bruins et al. | |
| 2017/0205353 A1 | 7/2017 | Galli et al. | |
| 2019/0383782 A1 * | 12/2019 | Steiner | A01K 45/00 |
| 2021/0215663 A1 | 7/2021 | Bruins et al. | |

FOREIGN PATENT DOCUMENTS

| | | |
|---|---|---|
| DE | 10 2016 004 051 | 7/2017 |
| DE | 10 2016 005 974 | 11/2017 |
| DE | 10 2016 011 348 | 3/2018 |
| DE | 10 2018 105 512 | 7/2022 |
| EP | 3 859 341 | 8/2021 |
| FR | 3 075 965 | 6/2019 |
| RU | 2015 106 609 | 9/2016 |
| RU | 2019 115 818 | 11/2020 |
| WO | 2017/017277 | 2/2017 |
| WO | 2017/174337 | 10/2017 |
| WO | 2018/078046 | 5/2018 |
| WO | 2018/115280 | 6/2018 |
| WO | 2019/025323 | 2/2019 |
| WO | 2020/020973 | 1/2020 |
| WO | 2021/145772 | 7/2021 |

OTHER PUBLICATIONS

Roberta Galli et al., "Contactless in ovo sex determination of chicken eggs", Current Directions in Biomedical Engineering 2017, vol. 3, No. 2, Internet: https://doi.org/10.1515/cdbme-2017-0027 , ., pp. 131-134.

Roberta Galli et al., "In ovo sexing of chicken eggs by fluorescence spectroscopy", In Anal. Bioanal. Chem., vol. 409, 2017, Dec. 14, 2016, pp. 1185-1194.

Roberta Galli et al., "In Ovo Sexing of Domestic Chicken Eggs by Raman Spectroscopy", In Anal. Chem., vol. 88, 2016, Aug. 11, 2016, pp. 8657-8663.

German Patent Office—Listing of State of the Art documents in counterpart German Appln. No. 10 2021 127 696.9.

Int'l Search Report (Form PCT/ISA/210) conducted in Int'l Appln. No. PCT/EP2022/079590 (Jan. 18, 2023).

Int'l Written Opinion Report (Form PCT/ISA/237) conducted in Int'l Appln. No. PCT/EP2022/079590 (Jan. 18, 2023).

* cited by examiner

METHOD AND ASSEMBLY FOR IN-OVO SEXING OF BIRD EGGS

The invention pertains to the technical fields of bioanalytics and agriculture, and relates to a method and an assembly for in-ovo sexing of bird eggs. The proposed method and the assembly can be used for example for sexing commercial poultry, in animal husbandry and commercial egg production.

A high negative correlation between laying performance and fattening performance prevents chickens from being used as egg producers and a source of meat at the same time. Thus, breeding in recent decades has led to the rise of specialized lines of commercial chickens, which either allow economic production of high-quality eggs (hens) or are suitable for efficient meat production (roosters and hens). While hens of the fattening lines are also fattened, roosters from laying lines can only be economically raised and marketed to a very small extent at the present time. This problem affects not only conventional egg production but also the keeping of laying hens according to ecological guidelines. The hitherto conventional method of killing the male offspring in laying hen lines immediately after hatching contradicts legal requirements and objectives of animal welfare, and consequently is confronted with ethical and legal concerns at home and abroad. Therefore, there is increased research activity with regard to alternatives to killing male day-old chicks when producing eggs. Invasive and noninvasive methods for sexing fertilized chicken eggs at various incubation time periods have been described previously.

Various methods for sexing bird eggs have already been proposed in the prior art. Thus, methods for sexing are known which are concerned with the detection of biological components, the spectroscopic characterization of blastodisc cells, the analysis of DNA-relevant cell material, the endocrinological determination of sample material taken from the bird embryo. It is furthermore known that the sex can be determined noninvasively by means of magnetic resonance tomography (MRT).

Moreover, the prior art discloses methods which pursue contactless in-ovo sexing using blood constituents of the bird embryo.

DE 10 2014 010 150 A1 discloses a method and an apparatus for sexing fertilized and incubated bird eggs in ovo by Raman spectroscopy, wherein a hole is introduced into the shell by way of a laser or mechanical perforation and the Raman-scattered radiation of the irradiated blood is captured and evaluated by means of an evaluation unit.

A contactless spectroscopic method and an apparatus for optical in-ovo sexing of fertilized and incubated bird eggs is described in DE 10 2016 004 051 A1. A hole is likewise introduced into the shell and sexing is implemented here by evaluating the Raman-scattered radiation on incubation day 4, which corresponds to an early embryonal stage before the onset of experiencing pain.

DE 10 2018 105 512 A1 discloses a method for determining fertilization and sex in ovo on a closed egg, wherein a closed egg is positioned, candled and/or illuminated, subsequently an image of the closed egg is recorded, then the captured data are evaluated and the position of the cardiovascular system situated in the egg is calculated, a detection unit is set above the calculated position of the cardiovascular system by means of a positioning unit and afterward the blood is excited, then the blood-specific and the blood-extraneous absorption spectra are detected and selected, fertilization is ascertained, and then the spectra with blood-extraneous information are compensated for by means of a compensation method and the spectra are classified for determining sex.

What is disadvantageous about the known solutions is that the in-ovo sexing is effected with an insufficiently stable prediction accuracy. What is also disadvantageous is that known methods and assemblies are complex and cost-intensive.

The object of the present invention is to specify a new method and an assembly provided for carrying out the method with which in-ovo sexing for bird eggs is effected with a high and stable sex prediction accuracy and which are simple and cost-effective to implement.

The object is achieved by means of the invention specified in the claims. The dependent claims relate to advantageous configurations of the invention.

The invention provides a method for in-ovo sexing of bird eggs, wherein the following method steps are carried out:

providing a fertilized bird egg incubated for between 3 and 9 days, producing an opening in the shell of the bird egg in the region of the sharp or blunt pole, irradiating and exciting blood of at least one constituent of the formed extraembryonic cardiovascular system of the embryo using at least two light-emitting laser beam sources which have different excitation wavelengths A in the range of 400 nm to 1064 nm and simultaneously excite fluorescence scattering and Raman scattering, capturing the spectra of the fluorescence scattering and Raman scattering, the spectra being excited in the blood and separated using at least two beam splitter devices and according to wavelength ranges, by means of at least two detector devices and processing the spectra by means of an evaluation unit, outputting the captured and processed spectra of the fluorescence scattering and Raman scattering as complementary spectra assigned to the different excitation wavelengths, ascertaining a classification value using the output complementary spectra of a selected spectral range and/or spectral intensity maxima $I_{Smax}$ of the fluorescence scattering and Raman scattering assigned to the respective excitation wavelengths, determining the sex by comparing the ascertained classification value with an intrinsically ascertained threshold value.

Advantageously, a temperature of the fertilized and incubated bird egg is set at between 35° C. and 38° C. while the method is carried out.

It is likewise advantageous if the at least two different excitation wavelengths differ by at least 0.3 eV of the emitted light.

Moreover, it is advantageous if at least one first laser beam having an excitation wavelength of 400 nm to 570 nm and at least one second laser beam having an excitation wavelength of 640 nm to 790 nm are used.

In one advantageous configuration of the method, complementary spectra in a backscattering wavelength range of 620 nm to 700 nm and 820 nm to 900 nm are used for ascertaining the classification value.

Advantageously, complementary spectra in the form of sex-specific spectra of molecular concentrations of the blood are processed for ascertaining the sex.

Likewise advantageously, the classification value is ascertained by algebraic combination of the respective intensity maxima $I_{Smax}$ of the complementary spectra assigned to the different excitation wavelengths and/or the spectral range of fluorescence scattering and Raman scattering, in which case, particularly advantageously, the classification value is ascertained by quotient formation, subtraction and/or summation.

Furthermore, it is advantageous if the intrinsically ascertained threshold value is realized by comparison operations of the classification value taking account of a predefined training set, formation of intensity ratios and/or neural networks.

The invention provides an assembly for in-ovo sexing of fertilized and incubated bird eggs using the above-described method, comprising at least one egg storage unit on which at least one fertilized bird egg incubated for 3 to 9 days is arranged in a positionally secured manner, at least two light-emitting laser beam sources whose laser beams have different excitation wavelengths and excite fluorescence scattering and Raman scattering in the blood of at least one constituent of the formed extraembryonic cardiovascular system, with at least one device for positioning the laser focus of the at least two laser beam sources, at least two excitation wavelength-dependent beam splitter devices which enable the excited fluorescence scattering and Raman scattering to be separated according to wavelengths.

at least one detector device for capturing the excited fluorescence scattering and Raman scattering, at least one evaluation unit for processing and outputting the fluorescence scattering and Raman scattering as complementary spectra assigned to the different excitation wavelengths, at least one classification unit connected downstream of the evaluation unit for ascertaining a classification value and for determining the sex.

In the case of the assembly according to the invention, it is advantageous if the laser beam sources have excitation wavelengths $\lambda_1, \lambda_2 \ldots \lambda_i$ in the range of 400 nm to 1064 nm.

Moreover, it is advantageous if the different excitation wavelengths differ by at least 0.3 eV.

In one advantageous configuration of the assembly, a first laser beam source has an excitation wavelength $\lambda_1$ of 500 nm to 550 nm and a second laser beam source has an excitation wavelength $\lambda_2$ of 750 nm to 790 nm.

It is additionally advantageous if at least one wavelength multiplexer with downstream coupling apparatus is present for incoupling the laser beams having different excitation wavelengths.

Moreover, it is also advantageous if the laser focus of the at least two laser beams in the xyz-direction and/or the beam waist are/is set substantially identically.

The present invention provides a new method and an assembly provided for carrying out the method with which in-ovo sexing for bird eggs is effected with a high and stable sex prediction accuracy on the basis of the biochemical molecular profile of the bird egg and which enable a simple and cost-effective method for sexing. Furthermore, the present invention describes a solution which makes it possible to compensate for the natural variations surprisingly discovered in the biochemical molecular profile of bird eggs in the measurement.

The essential advantages of the solution according to the invention are achieved by means of a method for in-ovo sexing of bird eggs, wherein a first method step involves providing at least one fertilized bird egg incubated for between 3 and 9 days, wherein an opening is produced in the shell in the region of the sharp or blunt pole.

After the bird egg has been opened, the blood of at least one constituent of the formed extraembryonic cardiovascular system of the embryo is irradiated through the opening in the shell using at least two light-emitting laser beam sources. The blood is irradiated by means of at least two laser beams having different frequencies and hence excitation wavelengths.

In order to prevent the action of the laser beam energy from undesirably modifying the blood and its constituents and thus corrupting the biochemical molecular information essential for sexing, it has proved to be advantageous if the excitation of the blood is realized using at least two different excitation wavelengths in the range of ≥400 nm to 1064 nm.

It is essential to the invention that at least two laser beam sources having laser beams of different excitation wavelengths are used. What is achieved as a result is that an excitation of the blood of the embryo is effected in the same volume fraction, as a result of which, depending on the excitation wavelengths, fluorescence scattering and Raman scattering are brought about and at least two different complementary spectra are obtained as a result.

According to the invention, complementary spectra should be understood to mean such intensity spectra of fluorescence scattering and Raman scattering which due to different excitation wavelengths lead to a reversal of the plotted spectra of male and female spectral ranges.

Surprisingly, it has been discovered that lasers of different excitation wavelengths can register fluorescence and Raman spectra in which at least the fluorescence intensities of the two complementary spectra exhibit opposite behavior in relation to the sex. The opposite behavior of the fluorescence intensities excited by different frequencies leads to an amplification of sex-specific differences and thus to an increase in the sexing specificity and also sensitivity.

Figure 6:
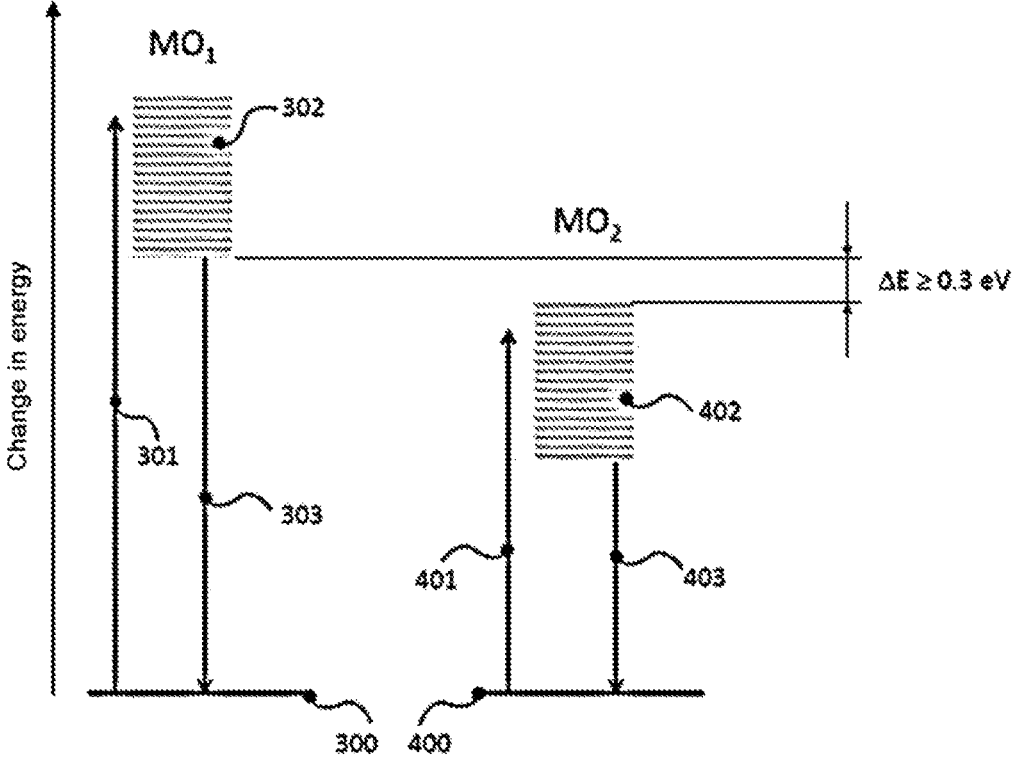

What is essential to the invention is that the complementary spectra concern information of sex-specific molecular concentrations obtained from the constituents of the blood, namely hemoglobin and protoporphyrin. What is essential to the invention in this respect is the selection of the spectra of two different biochemical molecules or molecular structural units whose relative concentrations exhibit inversely complementary behavior in relation to the sex. Referring to FIG. 6, one biochemical compound is present in a higher concentration in female embryos relative to male embryos and, complementarily, another biochemical compound is present in a lower concentration in female embryos relative to male embryos. The inversely complementary concentrations of the biochemical molecules in relation to the sex advantageously lead to an amplification of the sex-specific signals and at the same time can be used for intrinsic referencing.

For plotting uniquely assignable complementary spectra and for reliably determining the sex of the bird egg, it is advantageous if laser beam sources in which the excitation wavelengths of the at least two laser beams differ from one another by at least 0.3 eV are used for irradiating the blood of the embryo.

It has been established that when irradiating the embryonic blood with laser beams and excitation wavelengths of 400 nm to 570 nm, the fluorescence scattering of the blood of female embryos has a higher intensity than the fluorescence scattering of the blood of male embryos. By contrast, it has been discovered that when irradiating the embryonic blood of female embryos with laser beams and excitation wavelengths of 640 nm to 790 nm, the intensity of the fluorescence scattering is lower than the intensity of the fluorescence scattering of the blood of male embryos and the complementary spectra and the intensity maxima thereof thus exhibit sex-specifically opposite behavior. Furthermore, it has been established that the profiles of the fluorescence intensities and also of the Raman spectra have sex-specific molecular signals which can be used for assessment and sexing.

These insights make it possible for the first time to use the obtained complementary spectra on the basis of the different excitation wavelengths for a simple evaluation of the results and also for stable and accurate sexing with high prediction reliability. With the sex-specific molecular Raman-spectroscopic signals, the sexing certainty can be increased or validated.

The fluorescence scattering and Raman scattering excited in the blood are captured by means of at least one detector device, the complementary spectra subsequently being processed by means of an evaluation unit taking account of at least one intrinsic referencing and one or more computationally ascertained intrinsic referencing variables or referencing functions.

In the context of the invention, intrinsic referencing should be understood to mean a procedure during the processing and evaluation of the fluorescence scattering and Raman scattering obtained in which deviating and potentially result-influencing method parameters or varying sex-nonspecific signals are compensated for or normalized and absolute fluctuations of the intensities or other internal or external influences are thus eliminated from the result of the intensity spectra. The intrinsic referencing can be used to determine a freely definable inner standard value or an isobestic point to be designated by analogy with absorption spectroscopy. In particular, better comparability of the registered intensity spectra and a higher prediction accuracy in the course of sexing are achieved as a result.

The invention involves outputting the captured and processed intensity spectra of the fluorescence scattering and Raman scattering from the complementary spectra assigned to the different excitation wavelengths. The sex of the embryo is subsequently determined from the obtained complementary spectra by ascertaining a classification value by means of algebraic, univariate, multivariate and/or logical combination.

It is conceivable for the classification value to be ascertained by algebraic computation operations of the respective intensity maxima of the complementary spectra of fluorescence scattering and Raman scattering assigned to the different excitation wavelengths. This procedure affords the advantage of rapid, simple and cost-effective ascertainment of the classification value in the course of sex-specific determination using one or more cost-effective detector devices, such as one or more diodes, for example.

A data evaluation and classification of the intensity spectra of the fluorescence scattering and Raman scattering can be effected for example by the fluorescence and Raman spectra of the excitation wavelength $\lambda_1$ and fluorescence and Raman spectra of the excitation wavelength $\lambda_2$ being classified by means of classifiers in a first step, the classification values being determined for both classes. Using a comparison or referencing algorithm, two classification values for the classes "male" and "female" are ascertained from the determined classification values. These classification values are converted into a definition and output of the sex by a further algorithm, in which case the sex assignment can be output in either singular or binary form with indication of the probability. The binary output has the advantage that not very unambiguous sex statements can be assessed from economic viability standpoints for the hatchery. What can thus be achieved is that either preferably male chicks or female chicks are recognized with high accuracy and are withdrawn from or taken to the incubation process. In the case of raising laying hens, this has the advantage that unwanted male animals do not have to be raised as well. The calculation of classification values generally makes it possible to set the desired sexing specificity and/or sensitivity.

However, it is also possible for the classification value to be determined taking account of predefined spectral ranges which are assigned to the complementary spectra of the respective different excitation wavelengths.

The categorization of the ascertained classification value can be realized by way of comparison operations of the classification value using a predefined training set, formation of intensity ratios and/or neural networks, which yield a threshold value for sexing as a result.

In the course of implementing the method according to the invention, it was able to be discovered that the temperature of the blood in the extraembryonic cardiovascular system of the embryo has a significant influence on the metabolic function and on the intensity of the excited fluorescence scattering and Raman scattering after irradiation with laser beams. In order to ensure a high measurement and prediction accuracy vis-à-vis the sex, it is therefore advantageous if the temperature of the fertilized and incubated bird egg is set at between 35° C. and 38° C. while the method is carried out.

For carrying out the method for in-ovo sexing of fertilized and incubated bird eggs, the invention proposes a significantly improved and compact assembly comprising at least one egg storage unit on which at least one fertilized bird egg incubated for 3 to 9 days is arranged in a positionally secured manner. The invention proposes using at least two light-emitting laser beam sources whose laser beams have different, mutually superposed excitation wavelengths and excite fluorescence scattering and Raman scattering in the blood of at least one constituent of the formed extraembryonic cardiovascular system. Once at least one sanguiferous constituent of the formed extraembryonic cardiovascular system has been detected in the bird egg, the irradiation of the blood can be carried out by the at least two lasers with different excitation wavelengths. In this case, the irradiation can be effected at different positions of the cardiovascular system, provided that it is ensured that volume constituents of the blood are irradiated. As a result, a complex positioning device and detection of the extraembryonic cardiovascular system can be omitted, which leads to a cost-effective assembly.

The assembly according to the invention additionally comprises at least one device for positioning the laser focus, wherein advantageously the position of the focus of the at least two laser beams in the xyz-direction and/or the beam waist are/is set substantially identically. What is advantageously achieved by the substantially identical setting of the laser focus of the two different laser beams is that information about sex-specific molecular concentrations is obtained from the same volume fraction of the blood of the extraembryonic cardiovascular systems and identical conditions such as, for example, a comparable vessel strength of the sanguiferous constituents of the cardiovascular system are present. A significantly reduced error rate and better comparability of the obtained spectra in relation to the same volume constituent of the blood are made possible as a result.

Moreover, the assembly according to the invention comprises at least two beam splitter devices which enable the excited fluorescence scattering and Raman scattering to be separated depending on excitation wavelengths. The proposed beam splitter devices consist of excitation wavelength-dependent reflection and transmission devices and enable a rapid and simple separation and thus targeted relaying of the excited fluorescence scattering and Raman scattering for time-saving and rapid sexing with the information obtained.

In summary, the technical advantages and effects of the method according to the invention and of the associated assembly are that over a lengthened incubation time of from the 3rd day to the 9th day with stable measurement conditions, significantly more accurate sexing of the embryo is made possible by the use of at least two lasers having different excitation wavelengths in the range of 400 nm to 1064 nm, improved robustness of the method for in-ovo sexing vis-à-vis naturally occurring variations of the properties of bird eggs is achieved, a more rapid, simpler and less expensive method implementation is achieved, certain and simple recognition of non-living embryos or undesirable influencing variables is made possible by the use of at least two laser beam sources with a substantially identical focus position in the xyz-direction and substantially identical setting of the focal point size, a simple evaluation of the complementary spectra and classification of the sex by means of algebraic combinations with the possibility of additional combination with a supervised classification based on methods of optimum spectral selection or neural networks is possible.

Figure 2:
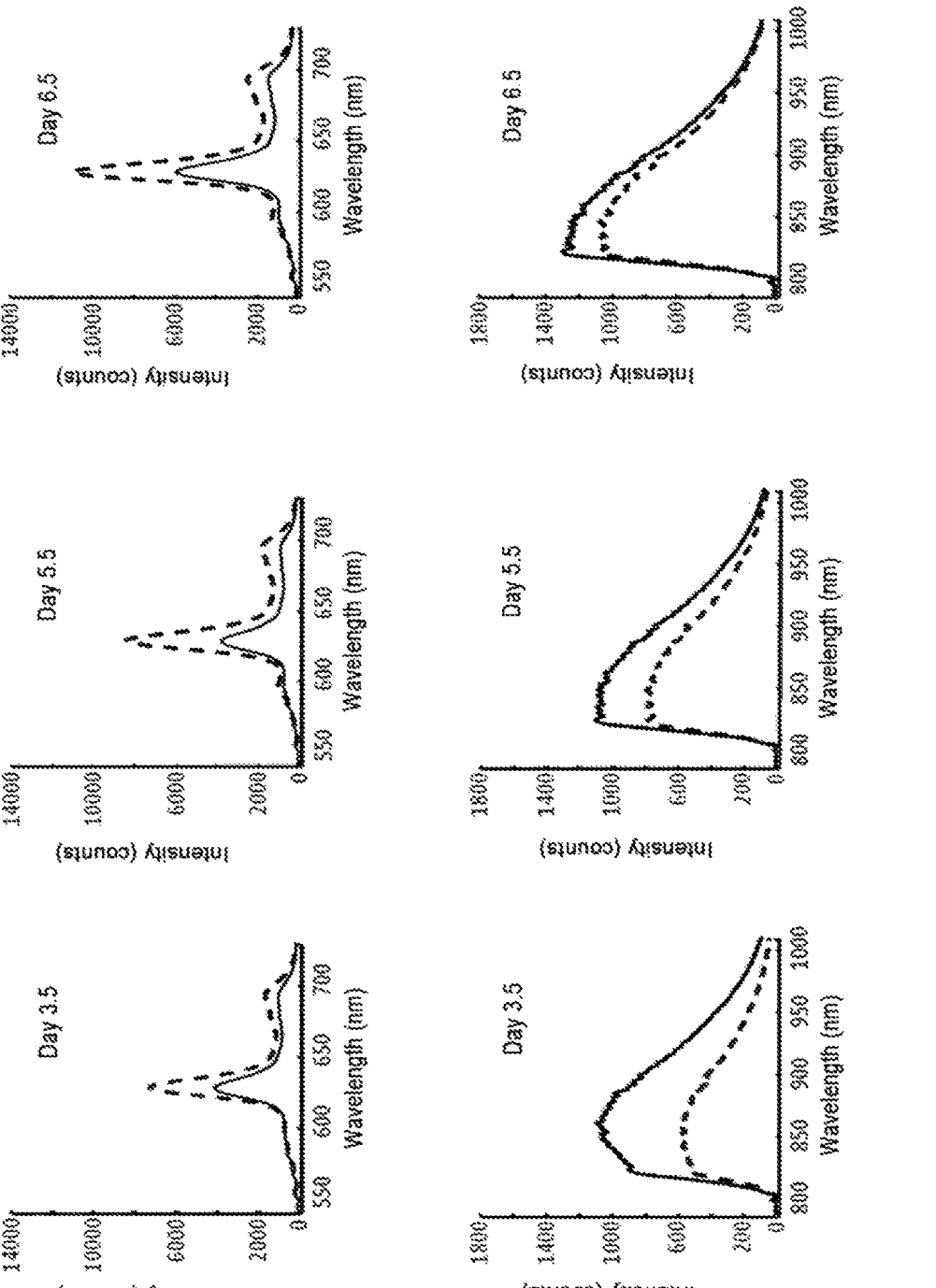
Figure 3:
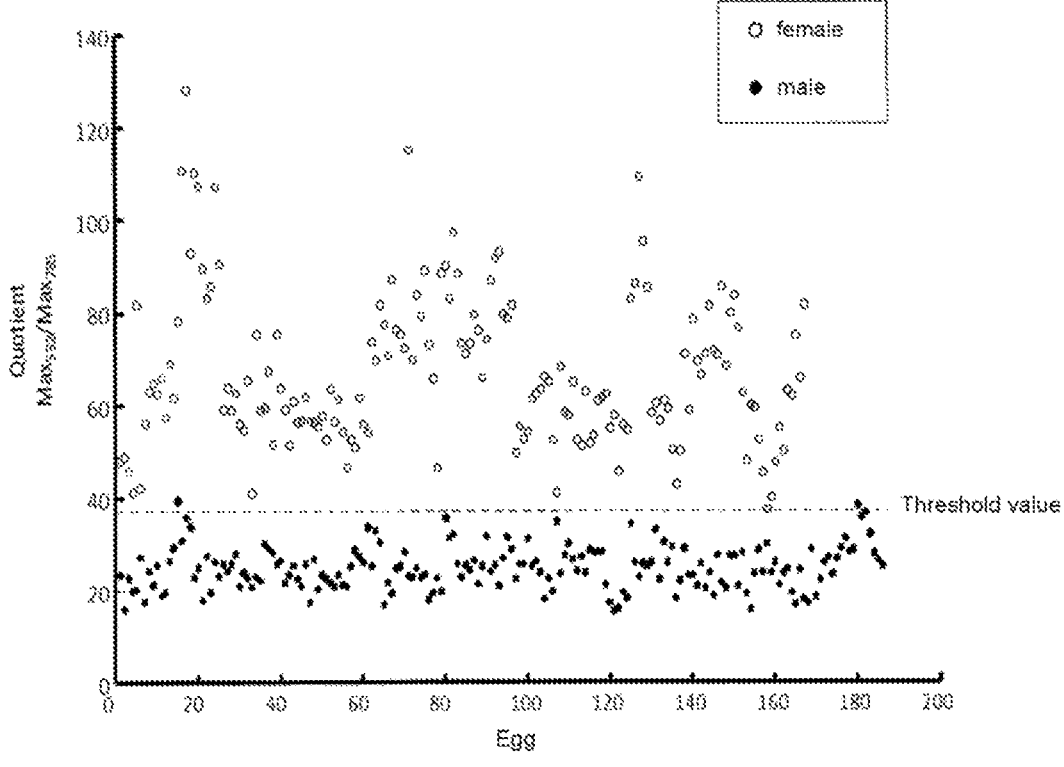
Figure 4:
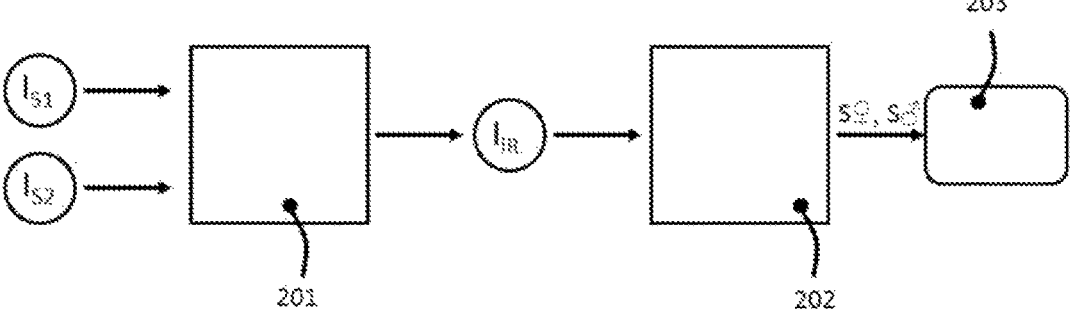
Figure 5:
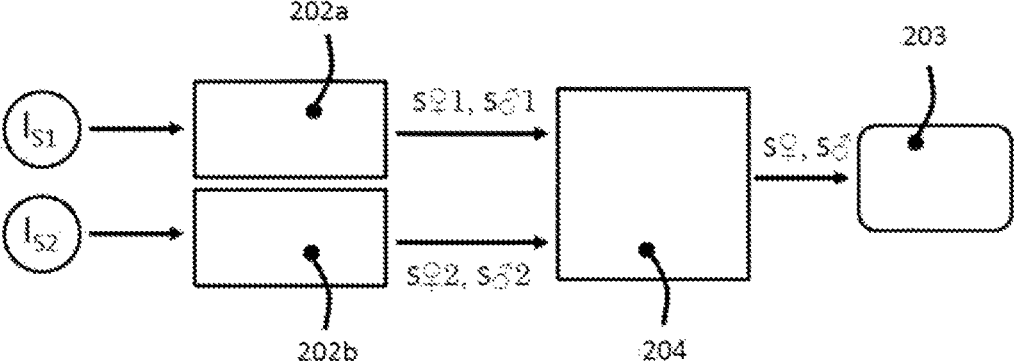

The invention is explained in greater detail below on the basis of exemplary embodiments. In the associated figures:

FIG. 1 shows a schematic illustration of the assembly according to the invention for in-ovo sexing on the blunt pole of an opened bird egg, FIG. 2 shows schematic illustrations of the registered intensity spectra dependent on the excitation wavelengths, on different incubation days, FIG. 3 shows the classification outcomes categorized by simple ratio formation in regard to the maxima of the complementary spectra obtained, FIG. 4 shows a schematic illustration of the evaluation method using a calculated spectrum with intrinsic referencing, FIG. 5 shows a schematic illustration of the evaluation method using a calculated classification value, and FIG. 6 shows a schematic illustration of the energetic intensity ratios of fluorescence scattering and Raman scattering in the form of a Jablonski diagram.

EXEMPLARY EMBODIMENT 1

FIG. 1 schematically illustrates an assembly for in-ovo sexing, wherein a fertilized, incubated bird egg 1 opened at the blunt pole is arranged in a positionally secured manner on an egg storage unit (not illustrated). There are two light-emitting laser beam sources 3 and 4 present, wherein the generated laser beam of the laser beam source 3 having an excitation wavelength $\lambda_1$=532 nm and the generated laser beam of the laser beam source 4 having an excitation wavelength $\lambda_2$=785 nm are incoupled into a coupling apparatus 6 via a wavelength multiplexer 5, and focused.

The laser beams are guided via an optical fiber 7 as excitation beam 7b by means of a mirror collimator 7a and by way of downstream mirror devices through the lens 8 and are radiated onto the extraembryonic cardiovascular system of the embryo with the different excitation wavelengths of $\lambda_1$=532 nm and $\lambda_2$=785 nm with an identically set focus position in the xyz-direction and an identical beam waist, whereby spatially identical volume fractions of the blood present in a blood vessel are excited.

An illumination device 20 with an illumination fiber 21 for illuminating the interior of the egg and also an additional camera 19 are arranged in direct proximity to the opening in the bird egg.

The excited fluorescence scattering and Raman scattering dependent on the different excitation wavelengths and also illumination beams of the illumination device 20 are separated via the beam splitter devices 9 (single edge 514 nm), 10 and 11 (T 813.5-1100 nm), captured wavelength-dependently by the detector devices 14 and 17 and forwarded to an evaluation unit (not illustrated).

In order to ascertain the sex of the embryo in the bird egg, the captured and amplified intensity spectra of the fluorescence scattering and Raman scattering which have been obtained from the blood constituents hemoglobin and protoporphyrin are processed in the evaluation unit and plotted as complementary spectra assigned to the excitation wavelengths $\lambda_1$ and $\lambda_2$ in accordance with FIG. 2. In this case, FIG. 2 shows the mean values of the evaluated intensity spectra on the incubation days 3.5, 5.5 and 6.5 for female and male embryos. The spectra clearly show the intensity differences in the complementary spectra at the excitation wavelengths $\lambda_1$ and $\lambda_2$ both with regard to the sex and with regard to the incubation day. A decrease in the relative intensity differences between female and male embryos as the incubation duration increases is additionally discernible. The spectra in FIG. 2 also elucidate the complementary character of the spectra, i.e. the different intensities exhibiting inverse behavior at the excitation wavelengths $\lambda_1$ and $\lambda_2$.

With the present complementary spectra, the mathematical evaluation and ascertainment of a classification value are subsequently effected by forming the quotient of the intensity maxima from the excitation wavelength $\lambda_1$=532 nm divided by the intensity maxima from the excitation wavelength $\lambda_1$=785 nm.

The categorization of the ascertained classification value and the determination of the sex of the embryo are subsequently effected with the aid of an intrinsically ascertained threshold value and comparison operations of the classification value in accordance with FIG. 3.

Exemplary Embodiment 2

An assembly for in-ovo sexing is provided and the method steps in accordance with exemplary embodiment 1 are carried out. For evaluation and sexing, the intensity spectra $I_{S1}$ and $I_{S2}$ of the fluorescence scattering and Raman scattering, the intensity spectra being dependent on the excitation wavelengths $\lambda_1$ and $\lambda_2$, are obtained in accordance with FIG. 4. The spectra $I_{S1}$ and $I_{S2}$ are subjected to an algebraic, univariate and multivariate and/or logical combination in the logic unit 201. The calculated intensity spectrum with intrinsic referencing ($I_{IR}$) is subsequently subjected to the algorithm for classification 202, the classification algorithm outputting probabilities for the association with the classes "female" and "male". The probabilities for class association are transferred as classification values for the class "female" ($S_♀$) and for the class "male" ($S_♂$) to an assessment unit with an algorithm for defining and outputting the sex 203. The sexing sensitivity and/or specificity can thus advantageously be set for each class. That allows for example a determination of female or male bird eggs which is very accurate and adjustable according to business management criteria.

Exemplary Embodiment 3

With exemplary embodiment 3, a further possibility for evaluating and classifying the spectra is presented in accordance with FIG. 5. An assembly for in-ovo sexing is provided and the method steps in accordance with exemplary embodiment 1 are carried out.

For evaluation and sexing, in accordance with FIG. 5, the fluorescence and Raman spectra $I_{S1}$ of the excitation wavelength $\lambda_1$ and fluorescence and Raman spectra $I_{S2}$ of the excitation wavelength $\lambda_2$ are classified independently of one another by the classifiers 202a and 202b, the classification values $S_{\female 1}$ $S_{\male 1}$ and $S_{\female 2}$ $S_{\male 2}$ being determined for both classes. By means of the comparison or referencing algorithm 204, two classification values $S_{\female 1}$ and $S_{\male 2}$ for the classes "male" and "female" are ascertained from the 4 classification values $S_{\female 1}$ $S_{\male 1}$ $S_{\female 2}$ $S_{\male 2}$. These classification values are compared and converted into a definition and output of the sex by a further algorithm 204. The comparison algorithm advantageously outputs probabilities for the association with the classes "female" and "male". The probabilities for class association are transferred as classification values for the class "female" ($S_{\female}$) and for the class "male" ($S_{\male}$) to an assessment unit with an algorithm for defining and outputting the sex 203. The sexing sensitivity and/or specificity can thus likewise advantageously be set for each class. That allows for example a determination of female or male eggs which is very accurate and adjustable according to business management criteria. However, it is also possible to carry out the sex assignment in a singular fashion.

FIG. 6 schematically shows the energetic states in sex-specific molecules or molecular groups. Proceeding from the energetic ground states 300 and 400, there ensues the energetic excitation with the excitation wavelength $\lambda_1$ 301 and the excitation wavelength $\lambda_2$ 401. According to the invention, the energetic bands of the excited energy levels 302 and 402 have a gap of at least 0.3 eV. This ensures that the energetic overlap of the fluorescence transitions 303 and 403 is only insignificant.

LIST OF REFERENCE SIGNS

1 Opened bird egg
2 Focus, spot
3 Laser 1 with excitation wavelength $\lambda_1$
4 Laser 2 with excitation wavelength $\lambda_2$
5 Wavelength multiplexer
6 Coupling apparatus
7 Optical fiber for excitation light
7a Mirror collimator
7b Laser radiation with excitation wavelengths $\lambda_1$ and $\lambda_2$
8 Lens 20×
9 Beam splitter 514 nm
10 Beam splitter
11 Beam splitter 813.5 to 1100 nm
12 Achromatic lens
13, 16 Optical fiber
14 Detector device
15 Collimator
17 Detector device
18 Lens 50×

19 Camera for 400-500 nm
20 Illumination unit
21 Illumination fiber
21a Light of camera image
100 Fluorescence scattering and Raman scattering
100a Fluorescence scattering and Raman scattering 500-750 nm
100b Fluorescence scattering and Raman scattering 785-1013 nm
201 Algebraic, univariate, multivariate, and/or logical combination
202 Algorithm for classification, output of classification values
203 Algorithm for definition, output of the sex
204 Referencing algorithm
300 Ground state of the molecule $MO_1$
301 Excitation wavelength $\lambda_1$
302 Energy level of the first singlet state of the molecule $MO_1$
303 Fluorescence transition of the molecule $MO_1$
400 Ground state of the molecule $MO_2$
401 Excitation wavelength $\lambda_2$
402 Energy level of the first singlet state of the molecule $MO_2$
403 Fluorescence transition of the molecule $MO_2$
$I_{S1}$ Intensity spectrum at excitation wavelength $\lambda_1$
$I_{S2}$ Intensity spectrum at excitation wavelength $\lambda_2$
$I_{iR}$ Intensity spectrum with intrinsic referencing
$S_{\male 1,2}$ Classification value for class "male"
$S_{\female 1,2}$ Classification value for class "female"

The invention claimed is:

1. A method for in-ovo sexing of bird eggs, wherein the following method steps are carried out:

providing a fertilized bird egg incubated for between 3 and 9 days, producing an opening in the shell of the bird egg in the region of the sharp or blunt pole, irradiating and exciting blood of at least one constituent of the formed extraembryonic cardiovascular system of the embryo using at least two light-emitting laser beam sources which have different excitation wavelengths λ in the range of 400 nm to 1064 nm and simultaneously excite fluorescence scattering and Raman scattering, capturing the spectra of the fluorescence scattering and Raman scattering, the spectra being excited in the blood and separated using at least two beam splitter devices and according to wavelength ranges, by means of at least two detector devices and processing the spectra by means of an evaluation unit, outputting the captured and processed spectra of the fluorescence scattering and Raman scattering as complementary spectra assigned to the different excitation wavelengths, ascertaining a classification value using the output complementary spectra of a selected spectral range and/or spectral intensity maxima ISmax of the fluorescence scattering and Raman scattering assigned to the respective excitation wavelengths, determining the sex by comparing the ascertained classification value with an intrinsically ascertained threshold value.

2. The method as claimed in claim 1, wherein a temperature of the fertilized and incubated bird egg is set at between 35° C. and 38° C. while the method is carried out.

3. The method as claimed in claim 1, wherein laser beam sources are used in which the at least two different excitation wavelengths differ by at least 0.3 eV of the emitted light.

4. The method as claimed in claim 1, wherein at least one first laser beam having an excitation wavelength of 400 nm to 570 nm and at least one second laser beam having an excitation wavelength of 640 nm to 790 nm are used.

5. The method as claimed in claim 4, wherein complementary spectra in a backscattering wavelength range of 620 nm to 700 nm and 820 nm to 900 nm are used for ascertaining the classification value.

6. The method as claimed in claim 1, wherein complementary spectra in the form of sex-specific spectra of molecular concentrations of the blood are processed for ascertaining the sex.

7. The method as claimed in claim 1, wherein the classification value is ascertained by algebraic combination of the respective intensity maxima $I_{Smax}$ of the complementary spectra assigned to the different excitation wavelengths and/or the spectral range of fluorescence scattering and Raman scattering.

8. The method as claimed in claim 7, wherein the classification value is ascertained by quotient formation, subtraction and/or summation.

9. The method as claimed in claim 1, wherein the intrinsically ascertained threshold value is realized by comparison operations of the classification value taking account of a predefined training set, formation of intensity ratios and/or neural networks.

10. An assembly for in-ovo sexing of fertilized and incubated bird eggs using the method as claimed in claim 1, comprising at least one egg storage unit on which at least one fertilized bird egg incubated for 3 to 9 days is arranged in a positionally secured manner, at least two light-emitting laser beam sources whose laser beams have different excitation wavelengths and excite fluorescence scattering and Raman scattering in the blood of at least one constituent of the formed extra-embryonic cardiovascular system, with at least one device for positioning the laser focus of the at least two laser beam sources, at least two excitation wavelength-dependent beam splitter devices which enable the excited fluorescence scattering and Raman scattering to be separated according to wavelengths, at least one detector device for capturing the excited fluorescence scattering and Raman scattering, at least one evaluation unit for processing and outputting the fluorescence scattering and Raman scattering as complementary spectra assigned to the different excitation wavelengths, at least one classification unit connected downstream of the evaluation unit for ascertaining a classification value and for determining the sex.

11. The assembly as claimed in claim 10, wherein the laser beam sources have excitation wavelengths $\lambda 1, \lambda 2 \ldots \lambda i$ in the range of 400 nm to 1064 nm.

12. The assembly as claimed in claim 10, wherein the different excitation wavelengths differ by at least 0.3 eV.

13. The assembly as claimed in claim 10, wherein a first laser beam source has an excitation wavelength $\lambda 1$ of 500 nm to 550 nm and a second laser beam source has an excitation wavelength $\lambda 2$ of 750 nm to 790 nm.

14. The assembly as claimed in claim 10, wherein at least one wavelength multiplexer with downstream coupling apparatus is present for incoupling the laser beams having different excitation wavelengths.

15. The assembly as claimed in claim 10, wherein the laser focus of the at least two laser beams in the xyz-direction and/or the beam waist are/is set substantially identically.

* * * * *